United States Patent [19]
Nelson et al.

[11] 3,885,867

[45] May 27, 1975

[54] MICROFICHE READOUT APPARATUS

[75] Inventors: Alfred M. Nelson, Redondo Beach; Robert G. McPherson; Maurice S. Martin, both of Palos Verdes Peninsula, all of Calif.

[73] Assignee: Cubic Industrial Corporation, San Diego, Calif.

[22] Filed: July 17, 1972

[21] Appl. No.: 272,193

Related U.S. Application Data

[63] Continuation-in-part of Ser. No. 219,103, Jan. 19, 1972, abandoned.

[52] U.S. Cl. .................................... 353/27; 353/95

[51] Int. Cl. ......................... G03b 1/52; G03b 23/08

[58] Field of Search ................. 340/172.5; 46/87.05; 353/25–27, 74–78; 33/1 M

[56] References Cited

UNITED STATES PATENTS

| | | | |
|---|---|---|---|
| 3,267,801 | 8/1966 | Abbott | 353/60 |
| 3,446,552 | 5/1969 | Gross | 353/27 |
| 3,472,585 | 10/1969 | Halberg | 353/27 |
| 3,509,651 | 5/1970 | Robbins | 353/27 |
| 3,528,735 | 9/1972 | Bluitt | 353/27 |
| 3,564,209 | 2/1971 | Loughnane | 353/26 |
| 3,632,198 | 1/1972 | Puffer | 353/60 |
| 3,704,451 | 11/1972 | Pearson | 353/25 |
| 3,764,900 | 10/1973 | Baldwin | 33/1 M |
| 3,799,662 | 3/1974 | Ueda | 353/27 |

FOREIGN PATENTS OR APPLICATIONS

| | | | |
|---|---|---|---|
| 1,110,485 | 4/1961 | United Kingdom | 353/27 |

*Primary Examiner*—Samuel B. Rothberg
*Assistant Examiner*—A. J. Mirabito
*Attorney, Agent, or Firm*—Brown & Martin

[57] ABSTRACT

A microfiche selector and readout including means for selecting an individual frame from a microfiche card, and with the selection either automatically with a keyboard input or manually controlled using a joy stick to control the position of the card and with a road map to indicate the controlled position of the readout of the card. The card is held in a jaw assembly which is normally biased to a closed position and with a solenoid control to maintain the jaw assembly in an open position when not in use. The jaw assembly and card are moved by an XY positioning system including three block members sliding on four rods and with one block acting as a follower and moving in both the X and Y directions on two rods. When the card is positioned at the proper frame position, the frame may be read out either by displaying the information contained in the individual frame on the card on a display screen or by providing a printout of the information in the individual frame on the card.

5 Claims, 15 Drawing Figures

MICROFICHE READOUT APPARATUS

This is a continuation-in-part of application Ser. No. 219,103 filed Jan 19, 1972, now abandoned.

The present invention is directed to a microfiche selector and readout apparatus for selecting an individual frame from a microfiche card, either automatically or manually, and displaying and/or reproducing the information in the individual frame selected. Microfiche cards are manufactured in a variety of formats and include a plurality of frames located in rows and columns so that each card contains a large number of individual frames. The individual frames may represent information such as pages of written material or drawings or any other type of visual information, and by providing a plurality of such frames on each card, a considerable reduction in volume for the storage of documents may be obtained. Generally, such cards are read out manually by selecting an individual card from a plurality of cards and with the selected card containing the information which is desired to be read out and by manually positioning the selected card to a readout position to read out a desired individual frame on the card. The present invention provides for a readout apparatus which has considerably faster retrieval time over the manual system and also reduces undesirable handling of the card.

In a first embodiment of the invention, the card is automatically moved to a preset readout location and with a control of the selection of other individual frames on the card accomplished by the use of a road map to display a visual image representing the position of the readout of the microfiche card. This display on the road map is automatically moved as the microfiche card is moved so as to visually present at all times an indication of the position of the readout of the card.

In a second embodiment of the invention, the movement of the card to the desired frame position for readout is automatically selected using a keyboard to insert the information as to the desired position of the individual frame for readout. The position of the card is then automatically moved to the position selected by the keyboard so that that particular individual frame selected may be read out.

In both the first and second embodiments of the invention, the card is held for movement by a jaw assembly, which assembly is moved by an XY positioning system to position the card held by the jaw assembly for readout of individual frames on the card. As indicated above, in the embodiment using an automatic selection, the jaw assembly is controlled to move to the position selected by the keyboard. In the embodiment using a manual control of the selection, the card is initially moved to a present location and then the card is manually controlled to move to the desired position for readout of a particular individual frame. This movement is aided by the visual display of the readout position at all times on the road map.

The jaw assembly is normally biased in a closed position to grip the card and when the card is being returned to the initial feed position, the jaw assembly is automatically opened to release the card. In order to insure that the jaw assembly is now ready to receive another card for readout, the jaw assembly is maintained in an open position by a solenoid. When a new card is presented for readout, the solenoid is controlled to release the jaw assembly, and since the jaw assembly is normally biased in a closed position, the jaw assembly grips the card and is now ready to provide for movement of the card to a desired readout position.

The movement of the card to the desired readout position as indicated above is provided by an XY positioning system. This positioning system is simple in structure and includes three block members sliding on four rods or channels, with one block acting as a follower and sliding in both the X and Y directions on two of the rods or channels which are perpendicular to each other. A plate member is positioned below the XY positioning system and includes an opening to act as mechanical limits to the follower block through the use of a pin member extending from the follower block into the opening. A pair of slots may extend from the opening in which to slide the pin member and follower block to the position for selecting and replacing the card, or to the position for manual insertion of a microfiche card.

The two block members other than the follower block are coupled to belt drives to control the position of the follower block in accordance with the position of the blocks coupled to the belt drives. The belts are driven by motors and the motor control may be automatic, as provided by the keyboard selection, or may be manual through the use of a joy stick which controls the movement and speed of the individual belt members in accordance with the position of the joy stick.

The individual microfiche cards presented for readout may be selected from a group of cards stored in a cassette and with the selection provided by a selector mechanism which is disclosed in copending application Ser. No. 272,192 filed July 17, 1972. It is to be appreciated however, that other types of selector mechanisms may be used to provide selection of an individual card from a group of cards. Also, an individual card may be inserted for readout in the readout device of the present invention, and the invention, therefore, is not to be limited to any particular system for storing cards and for selecting individual cards from such storage system.

A clearer understanding of the invention will be had with reference to the following description and drawings wherein.

Figure 2:
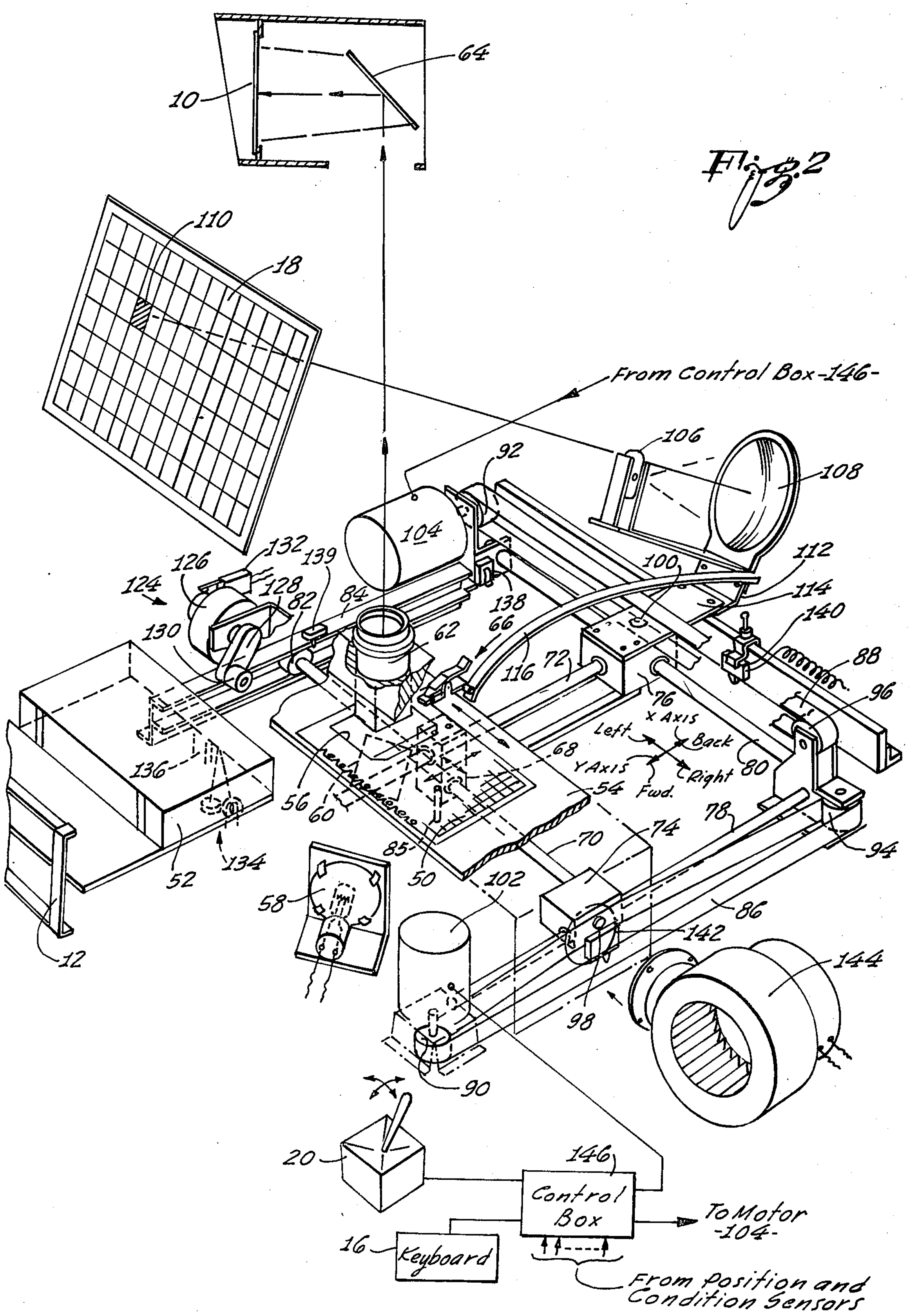
FIG. 2 illustrates the internal mechanism of FIG. 1 for providing movement of the card and including means providing the visual indication of the position of the card.
Figure 6A:
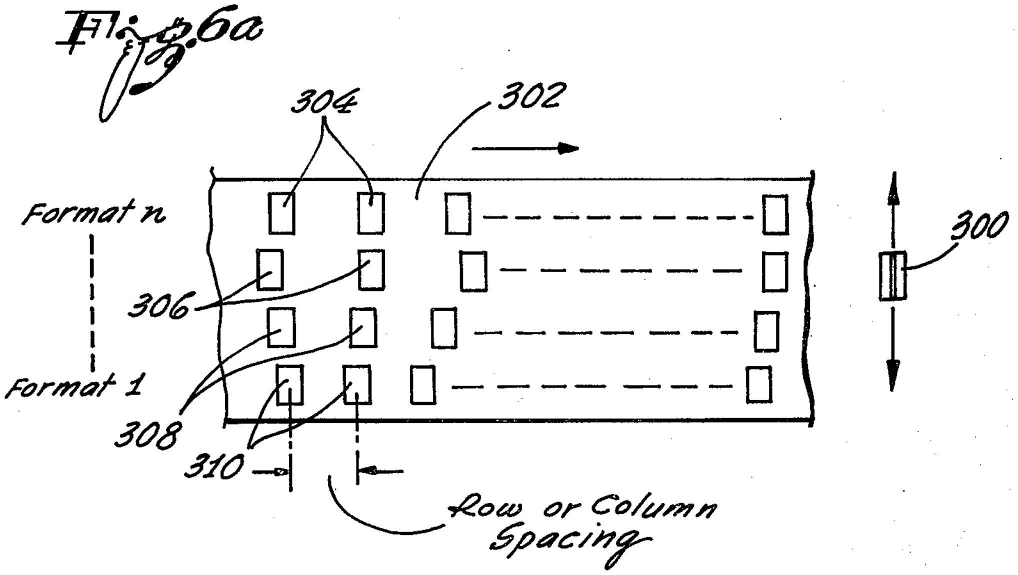
Figure 6B:
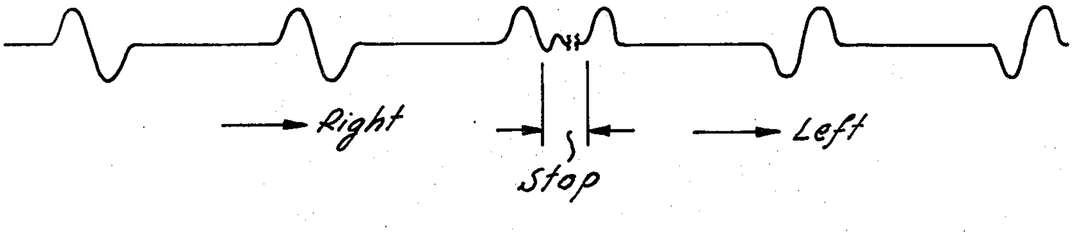
Figure 6C:
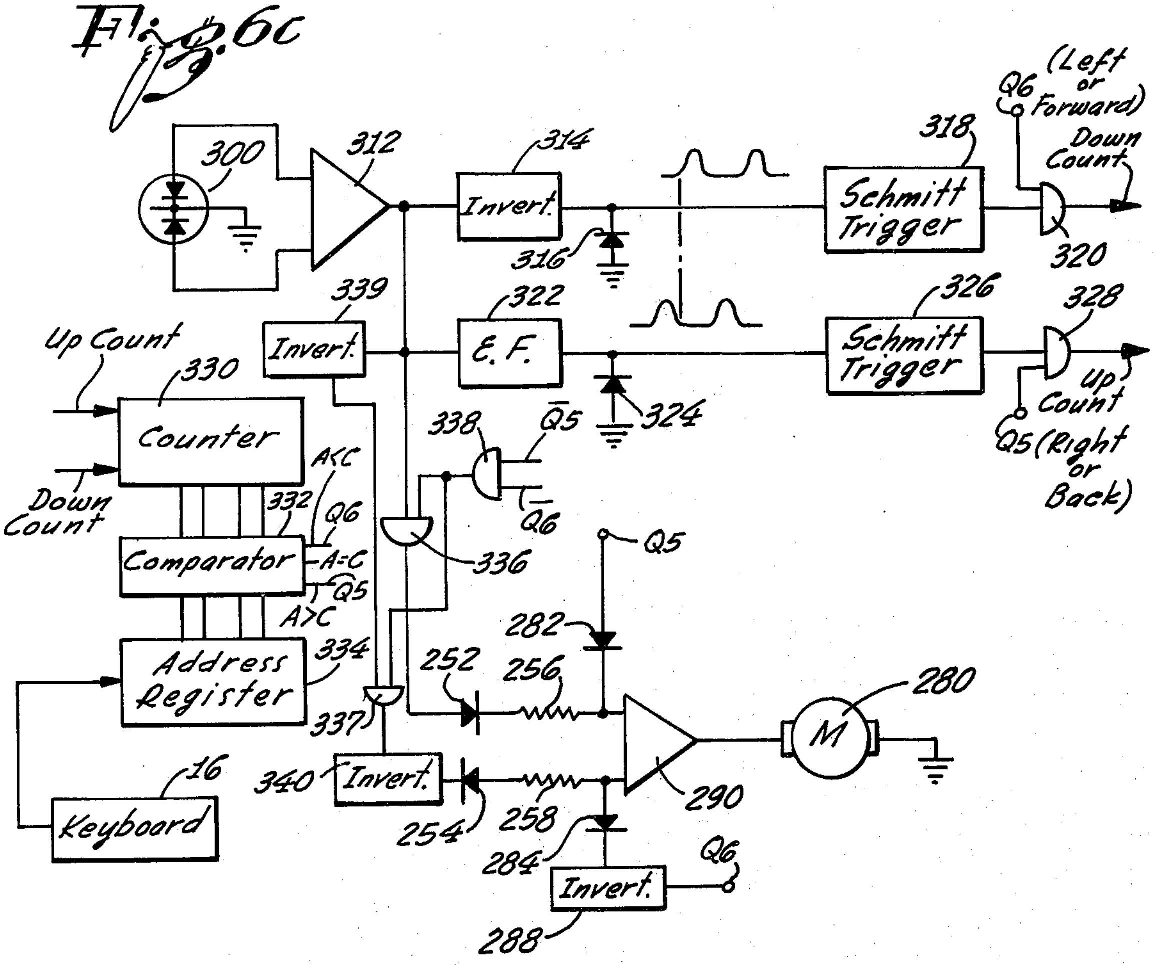
Figure 7:
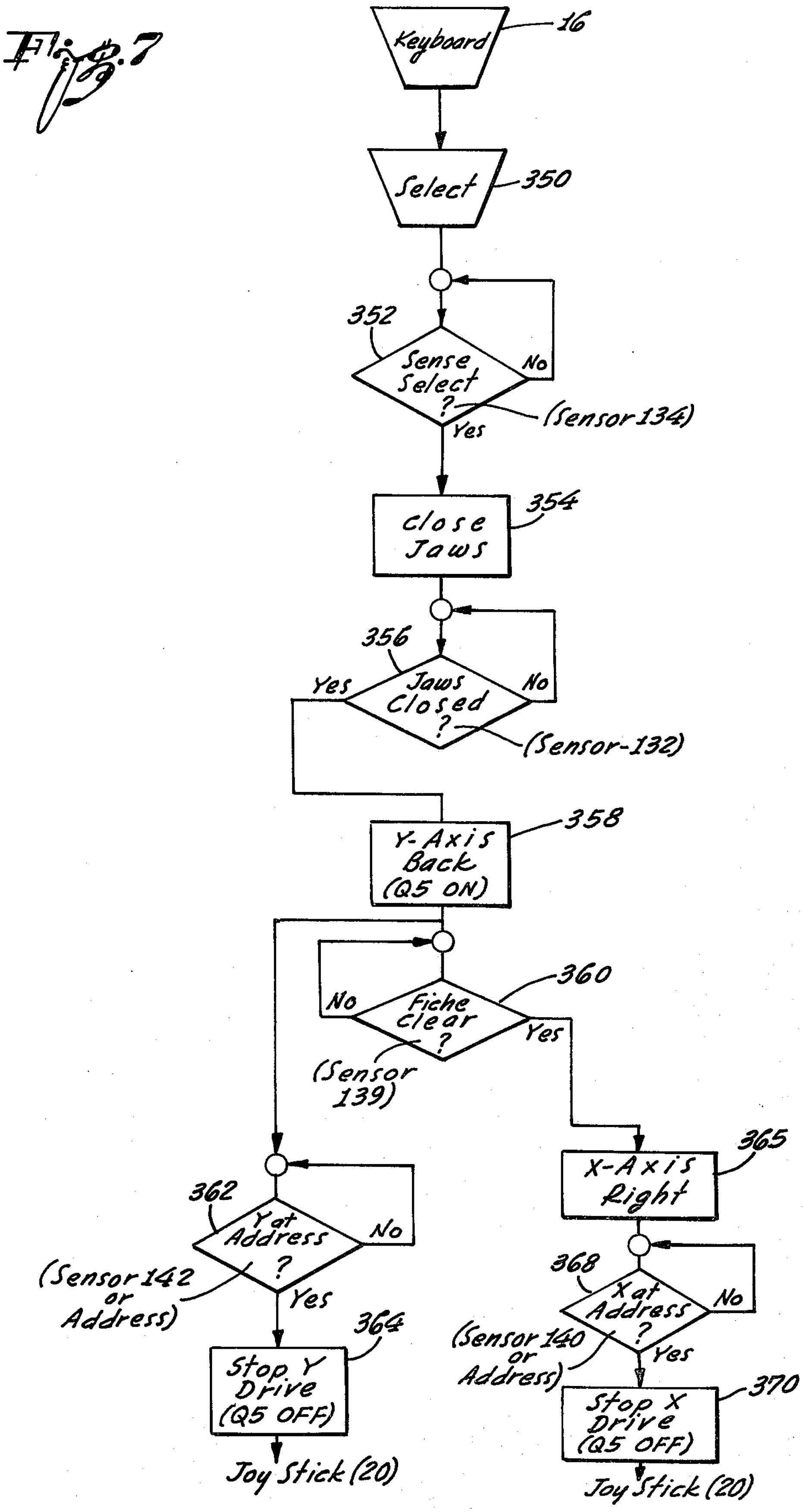
Figure 8:
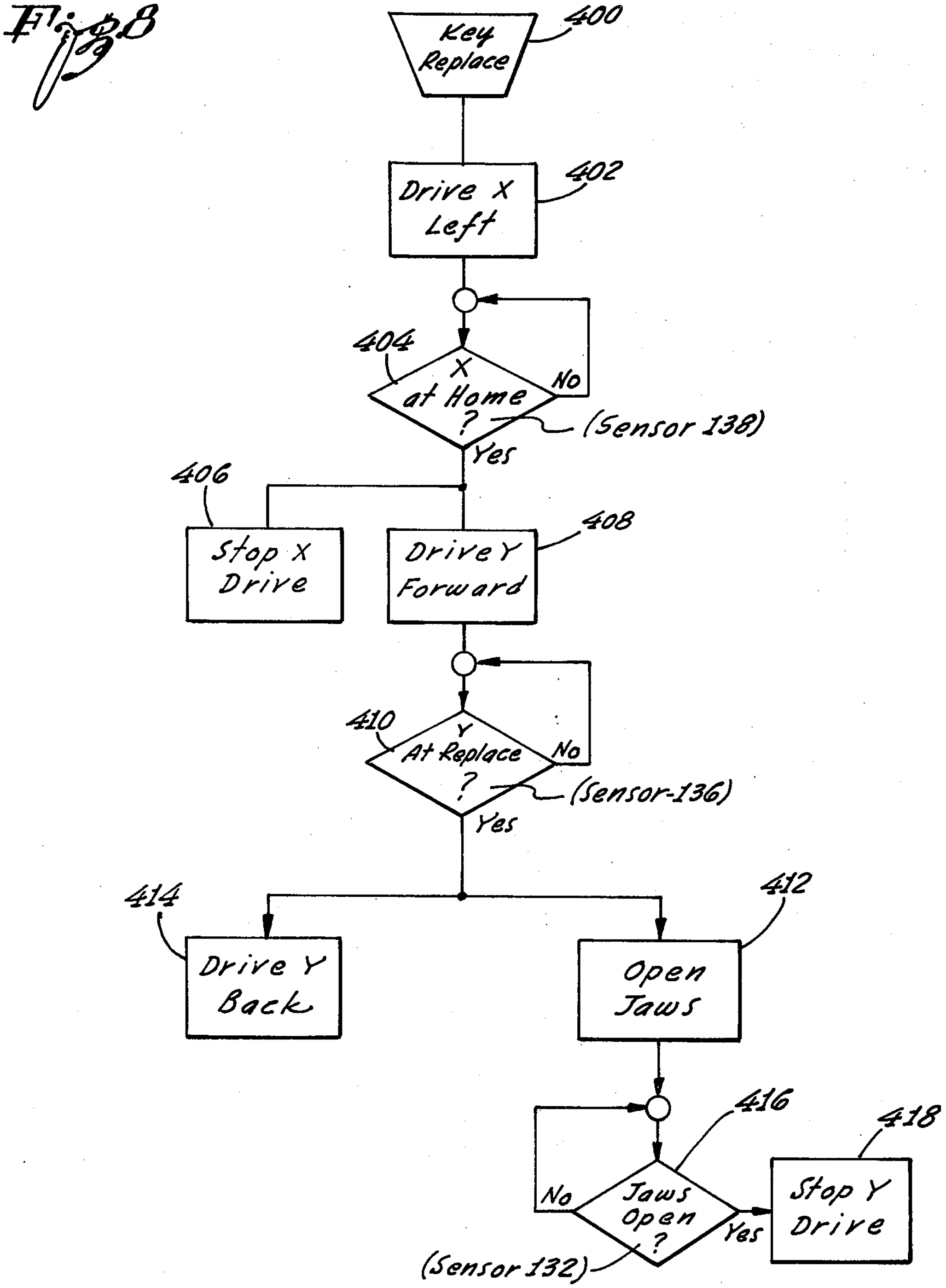
Figure 9:
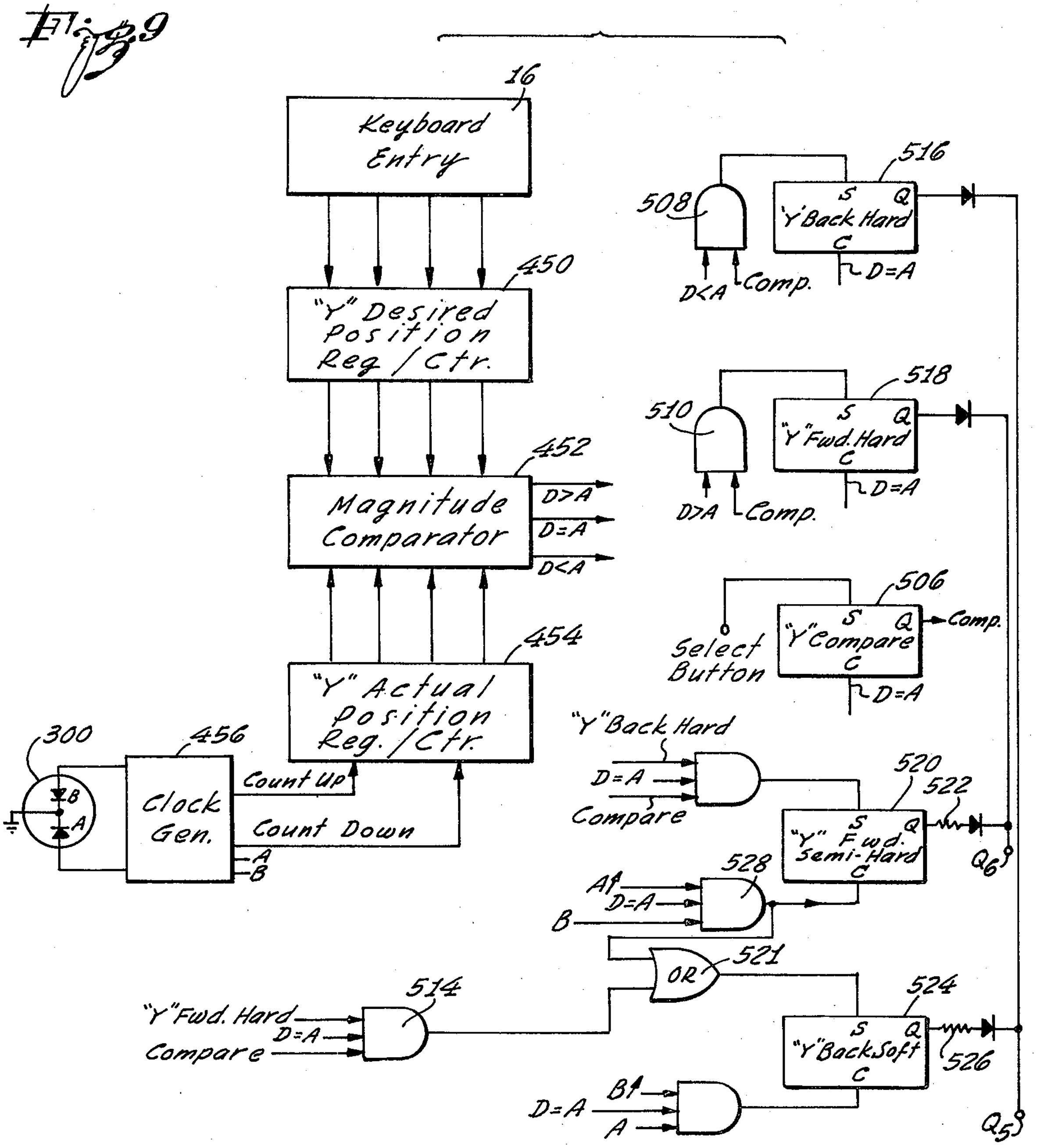
Figure 10:
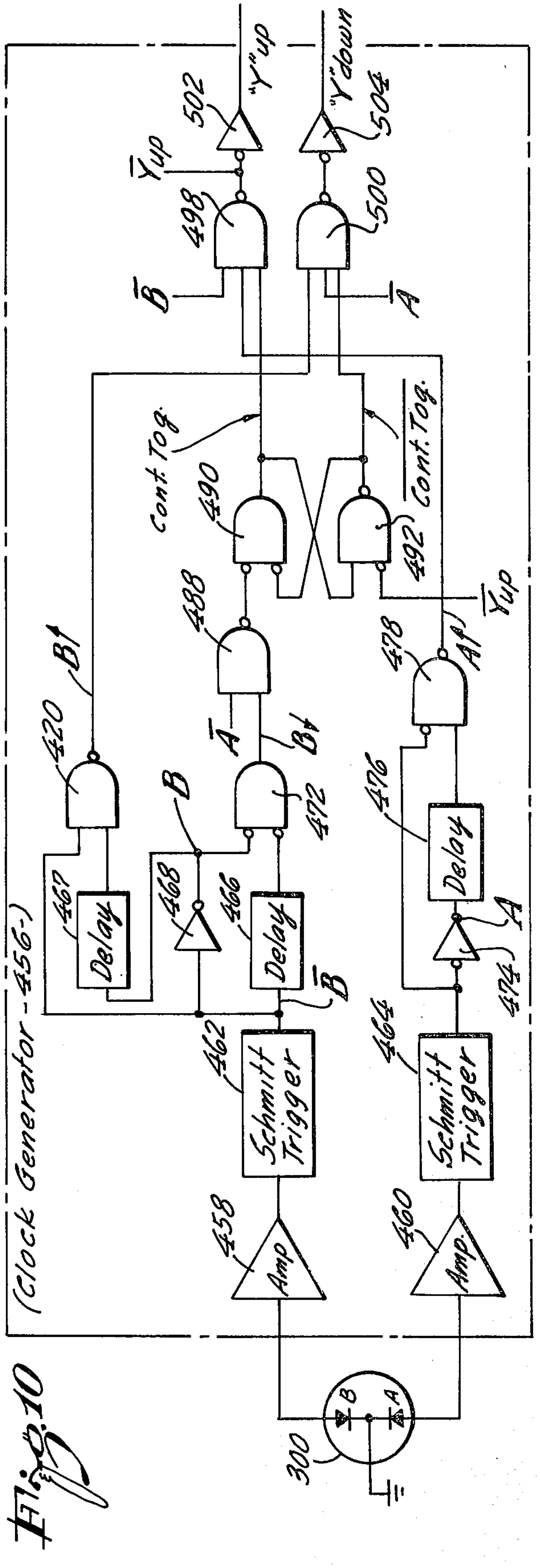
Figure 11:
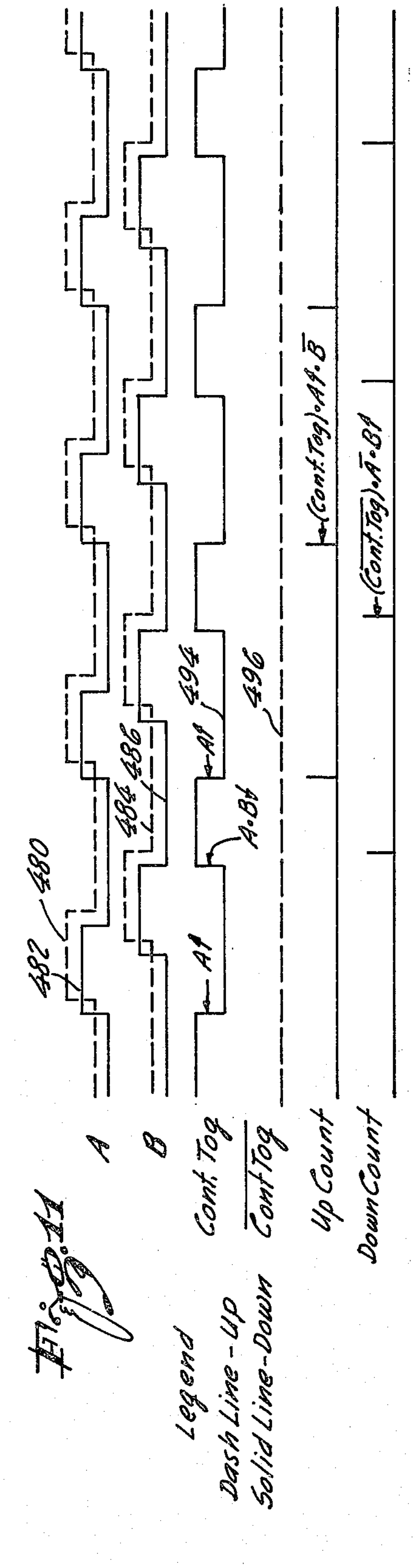
Figure 12:
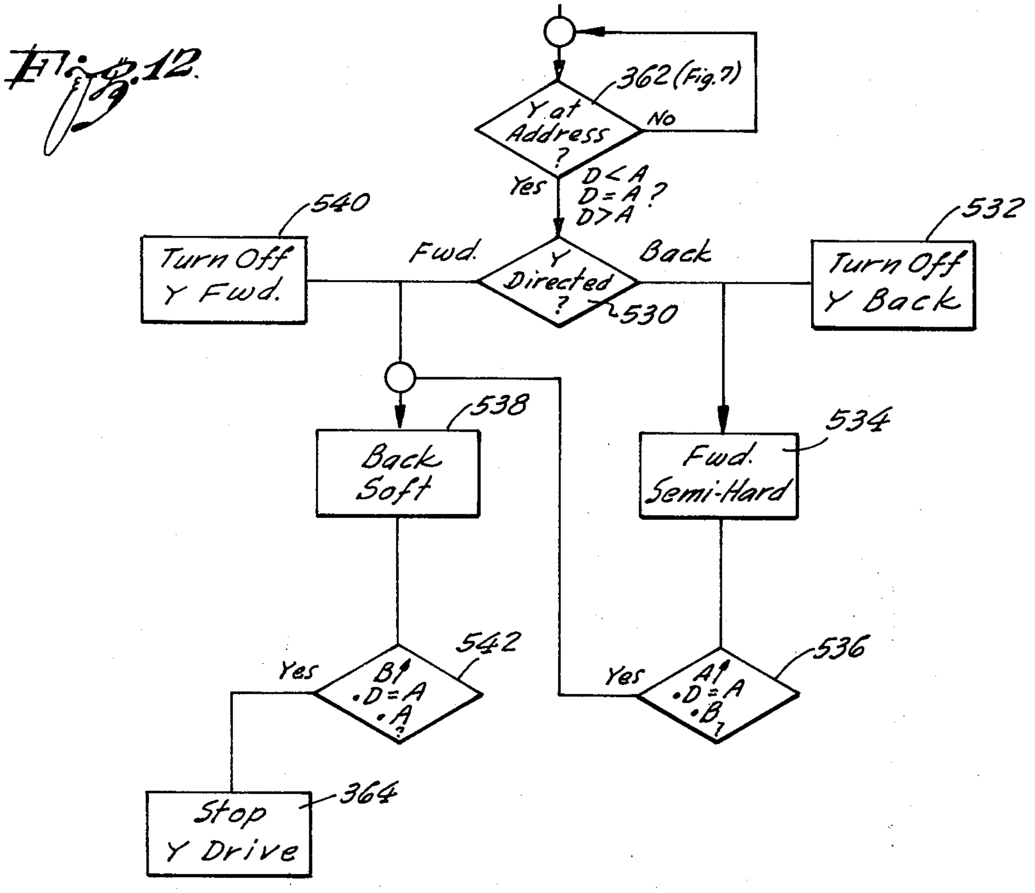
Figure 13:
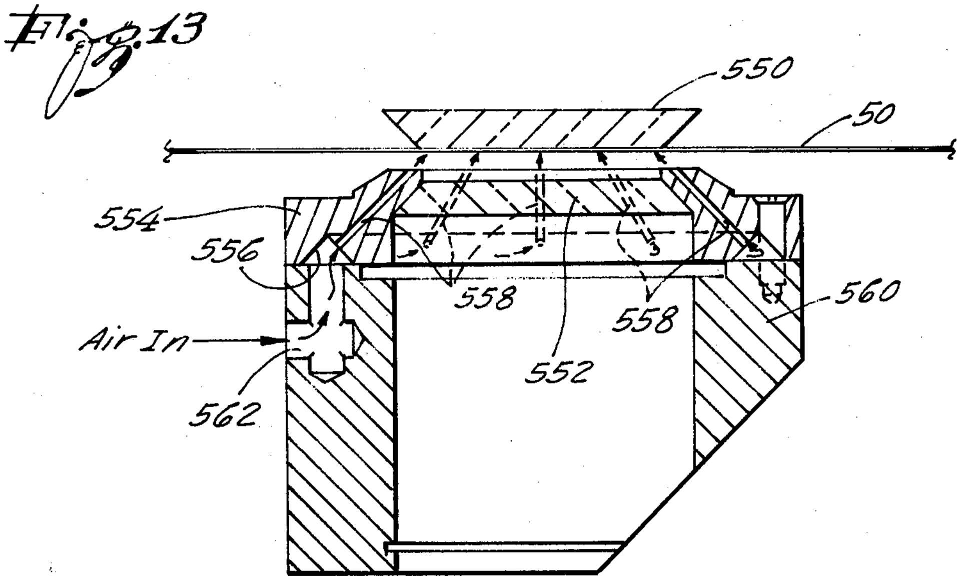

FIGS. 6(*a*), 6(*b*) and 6(*c*) illustrate a system for use in controlling the motor controller circuit of FIG. 6 in place of the joy stick;

FIG. 7 is a flow chart of the Select cycle of the readout apparatus of the present invention;

FIG. 8 is a flow chart of the Replace cycle for the readout apparatus of the present invention;

FIG. 9 is an alternative system for use in controlling the motor controller circuit of FIG. 6 and is specifically a digital control system;

FIG. 10 is a block diagram of the clock generator portion of the system of FIG. 9;

FIG. 11 is a series of waveforms useful in explaining the operation of the clock generator of FIG. 10;

FIG. 12 illustrates a modification of the flow chart of FIG. 7 in accordance with the operation of the automatic control system of FIG. 9; and FIG. 13 illustrates a detailed view of the aperture area 56 of the table 54 shown in FIG. 2 and specifically providing for optical accuracy in the reproduction of information from the microfiche card.

Figure 1:
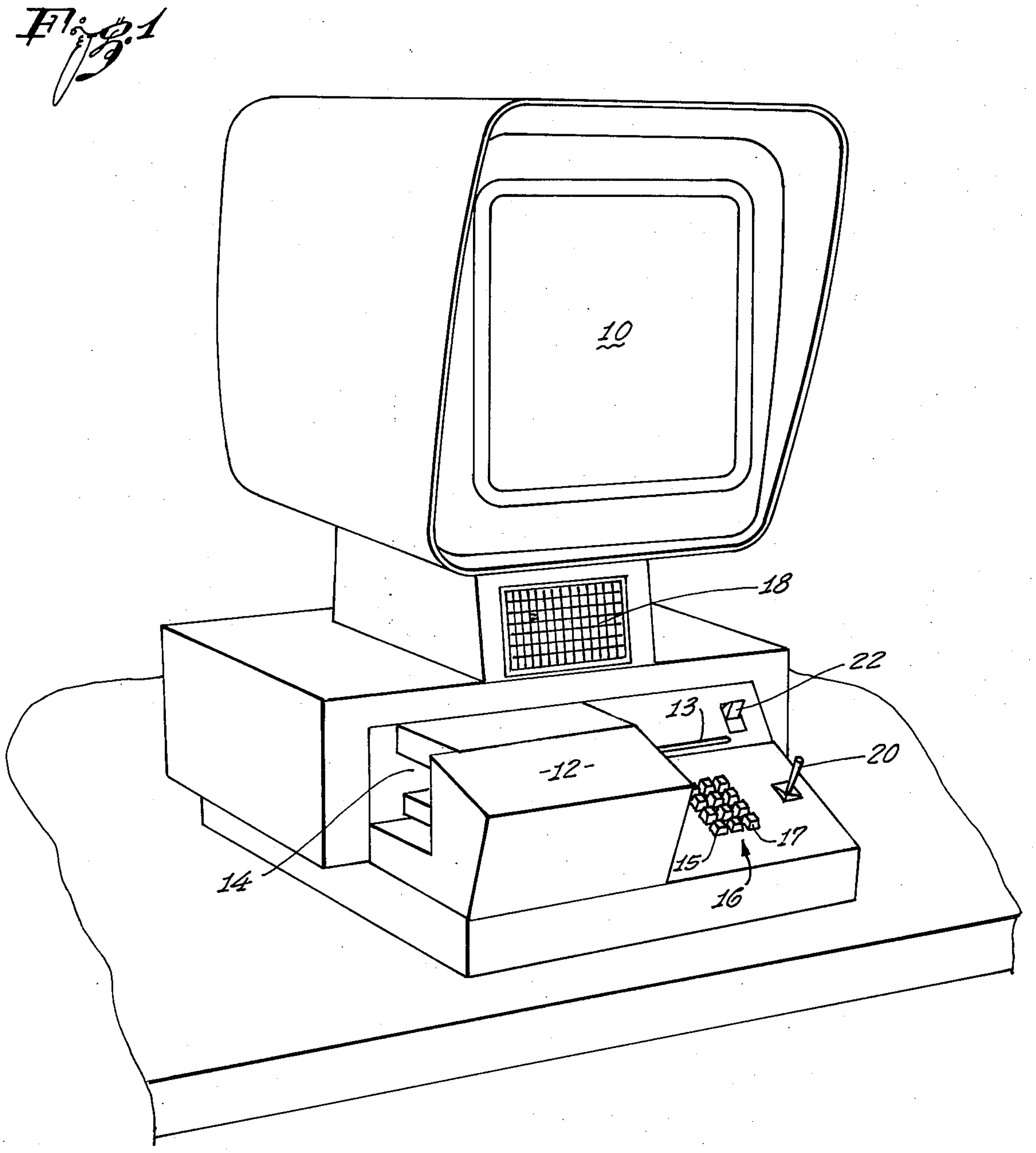
FIG. 1 illustrates the external configuration of the invention for providing a visual display of information on a microfiche card and specifically using a joy stick for providing manual control of the position of the card and including a road map for providing a visual indication of such position of the card.

In FIG. 1, an external view of the microfiche readout apparatus of the present invention is shown. Specifically, the readout apparatus includes a display screen 10 and a microfiche card selector 12 with an opening 14 to receive either a group of cards contained in a cassette or an individual card for display. The individual card may also be selected or replaced through the use of a slot 13. The readout apparatus of FIG. 1 also includes a keyboard control 16 to control the selection of an individual card if a card selector 12 is used to control the selection of an individual frame on an individual card if an automatic frame selection is used. The keyboard 16 would also include a Select key 15 and a Replace key 17 to initiate their respective functions in a manner to be described.

In the readout apparatus shown in FIG. 1, a road map 18 and a joy stick 20 are shown, which road map and joy stick would normally be used to provide for the manually controlled servoing of the position of a microfiche card as to display an individual frame on the card on the display screen 10 and with a visual indication of the position of readout shown on the road map 18. The road map 18 would have a grid configuration which conforms with the format of the frames present on the cards and the road map may have different formats corresponding to the different formats which may be present on the different cards that are available. Finally, an on-off switch 22 is used to control the application of power to the readout apparatus of FIG. 1.

It is to be appreciated that, although FIG. 1 illustrates the external configuration for a readout apparatus which has a manually controlled servoing of the positioning of the card for a readout of individual frames, the manual control, which includes the use of the road map 18 and the joy stick 20, may be eliminated and a full automatic control of the positioning of the card for the readout of the individual frames may be accomplished using the keyboard 16 in a manner to be described in a later portion of this specification. The mechanical configuration for moving the card for both the manual and automatic selection is substantially identical and therefore only a single embodiment of the mechanical configuration will be described and appropriate modifications may be made to provide for either manual or automatic selection of individual frames.

FIG. 2 illustrates the mechanical configuration of the invention to provide for readout of individual frames in a microfiche card. A microfiche card 50 is shown in position within the readout apparatus and it is to be appreciated that the microfiche card 50 may be either an individual card which has been inserted in the machine or may be a card which has been automatically selected from a cassette 52 using a selector mechanism 12. The particular form of the selector mechanism does not form a part of this aaplication and any appropriate mechanism may be used. The card 50 is supported on a table 54 and with an aperture 56 being provided in the table 54 to allow for light to pass through the table 54 and through individual frames on the card 50.

A light source 58 provides light energy which is directed by a mirror 60 upward through the card 50 and to a lens system 62. The lens system 62 magnifies the image on the card 50 and directs this image to a mirror 64 to change the direction of the path of the light energy 90° so as to present the information from an individual frome in the card 50 on the display screen 10.

The card is held for movement in the X and Y directions by a jaw assembly 66, which jaw assembly is connected to a block member 68. The block member 68 is a follower block and includes openings to receive rods 70 and 72 so as to slide on the rod in both the X and Y directions. The rod members 70 and 72 are also connected individually to an additional pair of block members 74 and 76. The details of this assembly may also be seen with reference to FIG. 4. The block members 74 and 76 also slide on rods 78 and 80 so as to form an XY positioner and with the position of the follower block 68 controlled in accordance with the position of the blocks 74 and 76. The rod member 70 is supported at is end opposite the block 74 by a roller 82 which rolls in a channel member 84. A pin member 85 is mounted on the bottom of the follower block 68 and extends within an opening 87 on slots 89 and 91, which openings and slots form mechanical limits and guide paths for the pin member and follower block.

Figure 4:
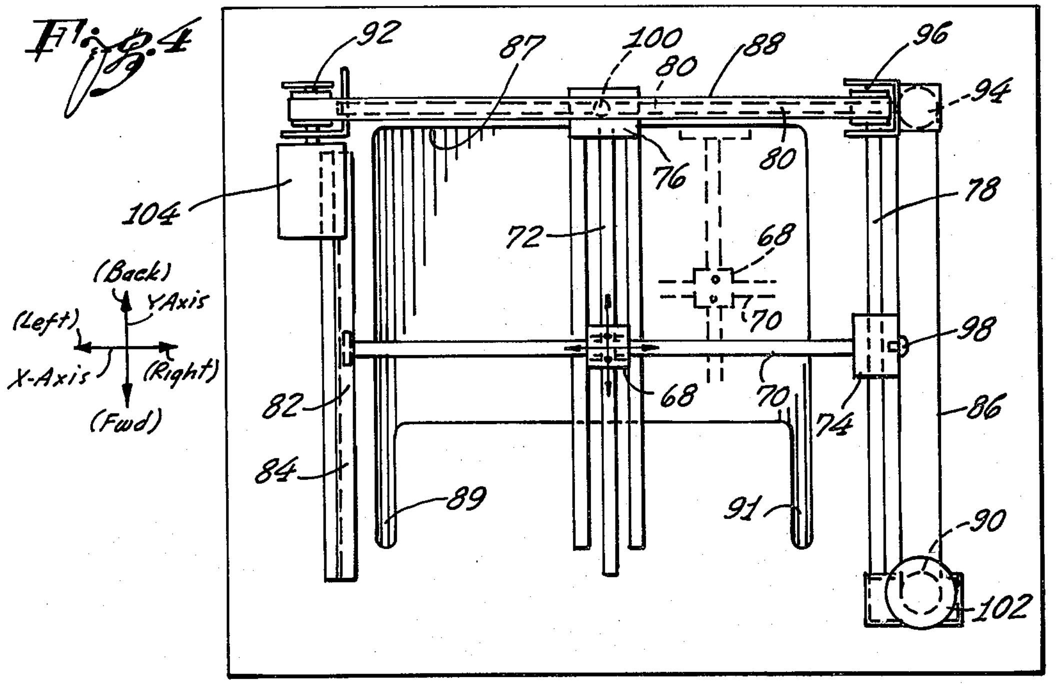
FIG. 4 illustrates the XY positioning system for controlling the movement of the jaw assembly of FIG. 3.

The position of the blocks 74 and 76 and therefore the follower block 68 is controlled by a pair of belt drives including belt members 86 and 88. The belt members 86 and 88 are supported by drive rollers 90 and 92 and idler rollers 94 and 96. The belts 86 and 88 are connected to the blocks 74 and 76 through bolts 98 and 100. The drive rollers 90 and 92 are controlled for rotation by motors 102 and 104. It can be seen, therefore, that as the motors 102 and 104 are controlled to rotate in either direction, this provides longitudinal movement of the belts 86 and 88, which in turn provides longitudinal movement of the blocks 74 and 76 sliding on the rods 78 and 80. There is a resultant XY motion of the follower block 68 as it slides on the rods 70 and 72 to produce an XY movement of the jaw assembly 66. The jaw assembly 66 grips the card 50 so that the card 50 may be moved in the X and Y directions in accordance with the proper control of the motors 102 and 104. In FIG. 4, a change in position of the follower block 68 is shown by the dotted blocks to illustrate how the follower block 68 may be moved in a diagonal direction by the simultaneous activation of the motors 102 and 104 so as to provide for a much greater speed for the positioning of individual ones of the frames in the microfiche card 50.

The slot 89 is used to guide the pin member 85 and the follower block 68 during the select and replace functioning. This provides accuracy in the select and replace position to insure accuracy in the XY positioning of the card and the proper replacement of the card. The opening 87 provides for maximum limits in the movement of the follower block 68. The slot 91 which may or may not be included operates in conjunction with the slot 13 shown in FIG. 1 to provide for an individual card to be inserted into the machine or for an individual card to be retrieved from the machine after having been selected from a group of cards by the selector 12. This allows for replacement or updating of an individual card.

The visual display of the position of the card 50 on the road map 18 is accomplished in the following manner. A light source 106 directs light to a condensing mirror 108 which in turn provides for a beam of light to produce a visual display on the road map 18. The beam of light may of course be provided by a conventional spot projection source. The road map 18, as well as the display screen 10, may be of the type which is semi-transparent so that light impinging on the rear surface provides a visual indication at the front surface of the screen. Specifically, as shown in FIG. 2, the road map 18 is providing a designation at location 110 which corresponds to the position of the card 50 and specifically the road map 18 provides an indication that a particular frame represented on the grid pattern on the road map 18 is being read out from the card 50.

In order to provide the visual indication on the road map 18 moving in accordance with movement of the card, the combination of the light source 106 and the condensing mirror 108 are mounted by a flexible spring member 112 to a plate member 114. The plate member 114 is in turn connected to the block 76. A long curved rod member 116 is also connected to the bottom support portion of the mirror 108 and to the follower block 68 and the jaw assembly 66. It can be seen, therefore, that as the block member 76 moves along the rod 80, the light 106 and the condensing mirror 108 follow along so that the visual display on the road map 18 is moved in accordance with such movement of the block 76. Also, as the block 76 moves along the rod 78, the flexible support member 112 is controlled by the rod 116 so that the mirror 108 and light 106 may be tilted upward and downward to provide for the second directional movement of the light display on the road map 18.

Figure 3:
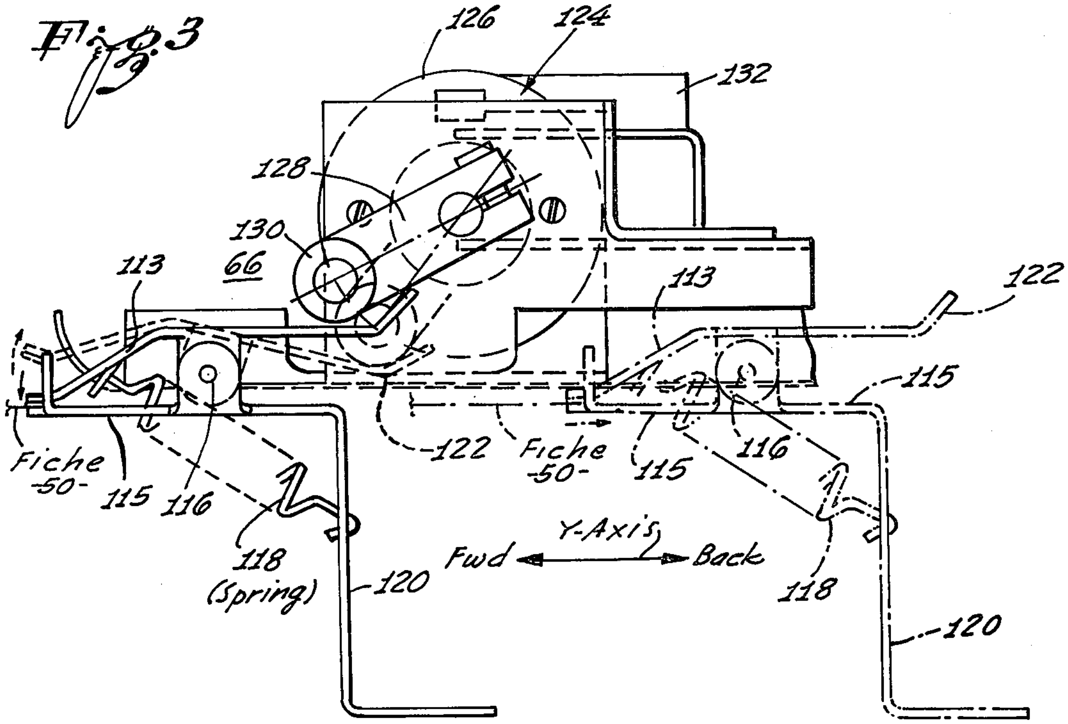
FIG. 3 illustrates in detail a jaw assembly for gripping the card for movement.

The jaw assembly 66 is shown in the closed position in FIG. 2 gripping the microfiche card 50. This jaw assembly 66 may be seen in more detail in FIG. 3 and includes an upper jaw member 113, a lower jaw member 115, and with the jaw member pivoting about a post member 116. A spring 118 maintains the jaws 113 and 115 in a normally closed position to grip the microfiche card 50. The lower jaw 115 includes an integral arm portion 120 which is connected to the follower block 68 so as to provide for movement of the entire jaw assembly. The upper jaw member includes a rearward bent portion 122 which cooperates with a solenoid assembly 124 to provide for the proper opening and closing of the jaw assembly to receive and release the microfiche card 50. This solenoid assembly may be seen in FIGS. 2 and 3 and includes a solenoid 126 and an arm member 128 having a roller 130 mounted on its end and with arm and roller controlled rotationally by the solenoid 126. The solenoid 126 therefore controls the arm 128 and roller 130 to be in the upper or lower positions as shown in FIG. 3. A microswitch 132 detects the rotational position of the solenoid 126 as it is controlled by command signals. It is to be appreciated that a second solenoid assembly substantially identical to the solenoid assembly 124 may be positioned adjacent to the slot 91 to control athe jaw assembly to select or replace cards at the slot 13 shown in FIG. 1.

Turning to FIG. 3, and specifically to the showing of the jaw assembly in the dotted righthand position, it can be seen that the jaw assembly 66 provides for the card 50 to be gripped by the upper and lower jaw members 113 and 115. Assuming that the card is being returned to the feed position, the jaw assembly 66 will be moved in a forward direction so that the roller 130 will engage the rear bent portion 122 of the upper jaw member 133 to provide for a rotation of the upper jaw member 113 around post member 116 to release the microfiche card 50. This occurs just prior to the jaw assembly activating a sensor 136. The output signal from the sensor controls the solenoid 126 and reverses the Y drive to pull the jaw assembly back to a feed position as shown by the dotted position in FIG. 3 with the jaws open. This mechanism provides for the arm and roller 128 and 130 to open the jaws to replace the card and to allow the jaws to be retracted to the feed position without allowing the jaws to close.

The fact that the solenoid is controlling the jaw to be fully opened representing the feed position, is detected by the detector switch 132 and this signal may be used to stop the Y drive. Also, the detector switch 132 provides information when the jaws have been closed and after a new card has been received so as to activate the Y drive. The jaw assembly may then be moved to the desired XY position as controlled by the XY controller shown in FIG. 4.

The mechanism of FIG. 2 also includes a number of other detectors which are used in the proper activation of the readout apparatus of the present invention and includes detectors 134 which is formed with a light source and a photocell to detect the presence or absence of a card at the feed location. Other detectors include the microswitch 136 described above which detects when the mechanism is in the extreme forward position for replacing a card. Microswitch 138 is used to detect when the X position of the mechanism is at the extreme left. Also, microswitch 139 is used to detect when the card is clear of the feed position and may now be moved to the right. Adjustable microswitches 140 and 142 may be positioned to provide for desired pre-address points so that the microfiche card when inserted in the machine will always be positioned at the same X and Y address. Finally, the mechanism of FIG. 2 includes a fan 144 which is used to provide cooling for the unit.

The joy stick 20 may be used to provide output signals to a control box 146 or, in the alternative, the keyboard 16 may also be used to provide signals to the control box 146. The control box 146 controls the activation of the motors 102 and 104. Specifically, the keyboard 16 may be used to provide output signals which allow the control box 146 to control the motors 102 and 104 to move the microfiche to particular positions in a manner to be described at a later portion of this specification. In the alternative, the joy stick 20 may also be used to provide for control signals to the control box. Essentially, the joy stick 20 includes a pair of potentiometers so as to provide for variations in the resistance in accordance with the direction in which the joy stick is moved and the distance the joy stick is moved. For example, if the joy stick is moved directly front or back, this provides control of only one potentiometer. If the joy stick is moved to the left or to the right, this provides control of the second potentiometer. The joy stick, however, may also be moved in angular directions so as to provide control of both potentiometers. This type of joy stick is commonly used to provide control of many types of remote control applications and the particular design of the joy stick is commonly known and forms no part of this invention.

Figure 5:
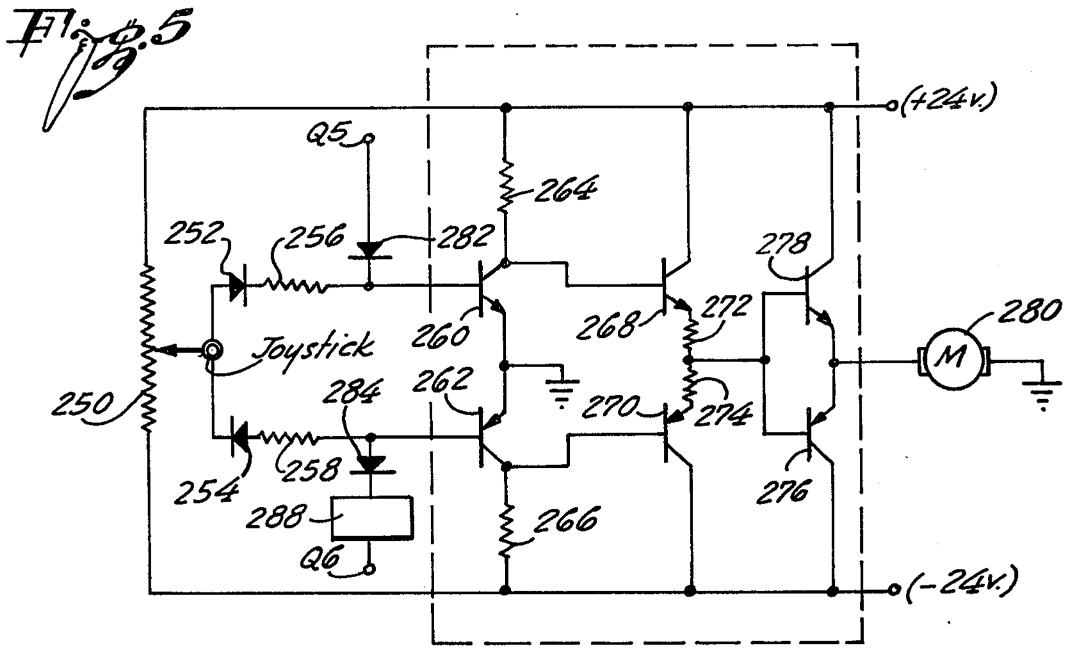
FIG. 5 is a schematic of an individual one of the XY motor controllers and is shown including manually controlled servoing of the movement of the card.

FIG. 5 illustrates a schematic of a motor controller for use in controlling the motors of FIG. 2. FIG. 5 illustrates a single motor control and it is to be aapreciated that a second such motor controller would be used so that a separate control for both the X and Y axes may be provided. In FIG. 5, the joy stick 20 is shown to provide for a control of a tap position for a potentiometer 250 and with the position of the joy stick 20 determining whether the output from the tap position of the potentiometer is plus or minus. It can be seen that the inputs to each side of the potentiometer 250 are plus and minus voltages of equal potential. Specifically, a plus and minus voltage of 24 volts is used. Therefore, the output at the tap when the joy stick is in the central position would be zero. If, however, the joy stick, is moved to either side of the central position, when a plus or minus voltage appears at the tap to be applied to the diodes 252 and 254.

The output from the diodes 252 and 254 is passed through bias resistors 256 and 258 to the bases of transistors 260 and 262. Assuming that the joy stick is moved so as to provide for a plus voltage, then the diode 252 would be forward biased so that the transistor 260 would be on. The opposite, of course, would occur if the joy stick were moved to a position to provide for a minus voltage. The transistors 260 and 262 include collector resistors 264 and 266. Assuming again that the voltage is plus so that the transistor 260 is turned on, the output across the collector resistor would be proportional to the voltage at the tap position of the resistor 250 as controlled by the joy stick 20.

The output from the transistors 260 and 262 is applied to a pair of transistors 268 and 270. These transistors have their collectors directly connected to the plus and minus voltages and have their emitters connected together through a pair of resistors 272 and 274. Assuming again that the transistor 206 is conducting, this would pull the base of the transistor 268 down and the point of connection between the resistors 272 and 274 would go more negative. A transistor 276 is then turned on to pass current through the motor 280 in a first direction. The motor 280 may represent any motor used in the XY positioning system incorporated in the readout device of the present invention. A second transistor 278 is included with the transistor 276, and when the joy stick is positioned to provide for the transistor 262 to be on, then the transistor 278 would be turned on to pass current through the motor in the second direction. The motor is therefore driven in first and second directions and with a magnitude in accordance with the position of the joy stick since the control to the transistors 276 and 278 is in porportion to the magnitude of the plus and minus voltages provided by the control of the tap positions by the joy stick 20.

Also included in the motor controller circuit of FIG. 5 are a pair of diodes 282 and 284 which are designed to pass voltages from control signals Q5 and Q6. The source for these control signals are from logic levels which are typically +5 volts with a common ground, all that is required is sufficient voltage to forward bias the transistor 260 and 262. An invertor 288 is used to invert the positive signal to a negative signal to provide the proper polarity signal. Therefore, when the signal Q5 is present, the diode 282 is forward biased so that the transistor 260 is turned on to ultimately provide a current through the motor 280 in a first direction. The opposite occurs when the signal Q6 is present so as to provide for current through the motor 280 in a second direction. This portion of the circuitry of the motor controller of FIG. 5 using the control signals Q5 and Q6 is used to move the card 50 to a preset position prior to the use of the joy stick 20. This circuitry would also be used in the control of the motor is automatically provided, such as by the application of signals from the keyboard 16 and a clearer understanding of this automatic control will be had with reference to FIG. 6 which includes the same elements of the motor controller shown in FIG. 5 with the exception that the joy stick control is eliminated and an automatic control is substituted. The motor amplifier 290 shown in FIG. 6 represents the dotted portion of the motor controller circuit of FIG. 5.

The system of FIG. 6 is illustrated in three portions. FIG. 6(*a*) illustrates a modification of the belts 86 and 88 so as to provide for the automatic positioning of the microfiche card under keyboard control; FIG. 6(*b*) illustrates the output signal from the differential photodetector 300 associated with the belt shown in FIG. 6(*a*); and FIG. 6(*c*) illustrates a block diagram of the system using the output signals from the differential photodetector 300 so as to provide for the automatic control. A motor represented by the motor 280 would be the same motor as used with the XY motor controller as shown in FIG. 6.

In FIG. 6(*a*) any of the belts used in the belt drive shown in FIG. 2 is represented by belt 302. It can be seen that the belt 302 may include a plurality of series of openings arranged along the parallel longitudinal axes of the belt 302. AS an alternative, the belt 302 may be opaque with transparent areas in place of the openings. For example, openings 304 may be a first series of longitudinal openings along a first longitudinal axis. Openings 306, 308, and 310 may be additional series of openings along additional axes. These various openings arranged along the parallel longitudinal axes may correspond to different formats present on the microfiche card. For example, the spacing between openings 304 through 310 represent row or column spacing for different formats used for microfiche cards. Therefore, it is possible to have a variety of such spacings for the different belts used for the X and Y axes so as to choose the appropriate series of openings which correspond to the particular row and column spacing for a particular card format. In this way, it is possible to provide for a proper row and column spacing for the format of the microfiche card being read. It is to be appreciated that different coding techniques may be used such as binary codes. Also, a large number of openings or transparent areas may be used with a count down to the proper number for the row and column spacing.

In order to choose the proper row and column spacing for the particular microfiche card, the differential photodetector 300 is movable on an axis perpendicular to the longitudinal axis of the belt 302 so as to detect individual ones of the series of openings 304 to 310. In this way, output signals from the differential photodetectors used with the different belts in the X and Y directions may represent particular row and column spacings for the format of the particular microfiche card being read. The circuitry and description for the automatic positioning system shown in FIG. 6 is illustrated for a single axis only, but it is to be appreciated that a duplication of the system for both axes is used to provide for control of both X and Y axes using an automatic control through the application of signals through the keyboard 16.

Turning now to FIG. 6(*b*), the output signal from the differential photodetector 300 is shown, assuming that the belt of FIG. 6(*a*) is moved first in a right direction then stopped and then moved in a left direction, and also assuming, of course, that a light source is directed toward the belt 302 so that whenever an opening is present, light energy will pass through the opening and be directed to the differential photodetector 300. The output signal from the differential photodetector 300 when the belt 302 moves in the right direction is a pulse signal and with each opening providing from the differential photodetection 300 a positive pulse immediately followed by a negative pulse. When the belt is automatically controlled to stop at the proper position, the belt will overshoot until nulled so that the last full pulse is a positive pulse. If the belt is then controlled in the left direction, the output signal from the differential photodetector 300 will be a pulse signal including a first positive pulse followed by a sequence of negative and positive pulses. This pulse sequence can be seen in FIG. 6 (*b*) which shows positive and negative pulses followed by a positive pulse for movement of the belt in the right direction and with a positive pulse followed by negative and positive pulses for movement of the belt in the left direction.

The output signal shown in FIG. 6(*b*) may now be tied into the automatic control system of FIG. 6(*c*) wherein the output of the differential photodetector 300 is applied to a differential amplifier is split through two pulse paths wherein the first path includes an inverter 314, a rectifier 316, a Schmitt trigger 318 and a gate 320 so as to produce a down count signal. The other pulse path is through an emitter follower 322, a rectifier 324, a Schmitt trigger 326 and a gate 238 so as to produce an up count signal. The up and down counts are applied to a counter 330, the output of which is applied to a comparator 332. The other input to the comparator 332 is from an Address register 334.

The input to the ADdress register is from the keyboard 16. Entry of information in the keyboard is fed to the Address register 334 to be stored and the number in the Address register is compared with the output from the counter 330 by the comparator 332 to provide for one of three possible signals. The first possible signal occurs when the number in the Address is less than the number in the counter (A<C) and at that time the first signal may be used as the Q5 signal. The second possible signal occurs when the number in the Address register is greater than the number in the counter (A>C) and at that time the second signal may be used as the Q5 signal. The third possible signal occurs when the number in the Address register is equal to the number in the counter (A=C) and at that time the third signal may be used to represent the condition when neither the Q5 nor Q6 signal is present. The Q6 signal is applied as an input to the AND gate 320 and the Q5 signal is provided as a signal to the AND gate 328.

The output from the differential amplifier 312 is also applied to a first AND gate 337 through an inverter 339. A second input to the AND gates 336 and 337 is provided by the output from a AND gate 338. The input to the AND gate 338 are signals representing the absence of either Q5 and Q6 signals. It can be seen, therefore, that if either signal Q5 or Q6 is present, then there will be no output from the AND gate 338 to thereby control the AND gates 336 and 337 not to pass the output from the differential amplifier 312. However, when both the Q5 and Q6 signals are not present, then an output from the AND gate 338 is provided to the AND gates 336 and 337 so that the output from the differential amplifier 312 is coupled through the AND gates 336 and 337 to the motor controller circuit so as to provide for a fine control of the position of the card 50 in a manner to be described in a later portion of this specification. An invertor 340 is used to provide the proper polarity signal to the motor controller circuit through the diode 254.

Turning now to the control of the motor control circuit in response to the keyboard information provided from the keyboard 16, let us assume that the XY controller is in its forward position to receive a microfiche card and that the keyboard information has been provided through the keyboard 16 to the Address register 334. It is now desired to provide for a movement of the XY positioning system to a particular desired position as represented by the keyboard input to provide for a readout of a particular individual frame on the microfiche card. The following description would apply to both the X and Y drives but ignoring the conditions which must be met before initiating these drives. These conditions will be described with reference to FIG. 7.

The counter 330 initially has a zero count and the Address register would therefore have a number greater than the number held in the counter 330 so that the comparator 332 now produces the Q 5 signal representing A>C to control the motor controller of FIG. 5 to drive the motor and also the belt. When the Q5 signal is provided, the AND gate 328 is also controlled to pass output pulses from the Schmitt trigger 326. The Schmitt trigger 326 is controlled by positive pulses which represent the positive portion of the pulse signal from the differential photodetector and with the negative signals being eliminated by the rectifier 324. The differential photodetector is producing output signals since the belt is moving in response to the motor drive controlled by the Q5 signal. An up count from the gate 328 is therefore provided to the counter 330 so that the counter counts up until the number held in the counter 330 is equal to the number held in the Address register 334. At this time, neither the Q5 nor Q6 signal is present so that no output will be provided from either of the AND gates 320 or 328. However, the gate 326 is turned on so that the output signal from the differential amplifier 312 is directly provided to the motor controller circuit.

The output signal from the differential photodetector 300 provided to the motor controller circuit is the central sloping portion formed between each pair of plus and minus pulses and provides for a fine control of the motor controller circuit. The coarse control is provided by the passage of the Q5 or Q6 signals through the diodes 282 and 284 to control the transistors 260 or 262 of the motor controller to be full on and with the fine control provided by the use of the central sloping portion of the output from the differential amplifier applied to the motor controller circuit. The fine control signal as passed through the gates 336 and 337 controls the movement of the motor 280 to the null point between a particular positive and negative pulse from the differential photodetector.

Assuming now that new keyboard information is addressed through the keyboard 16 to the Address register 334 and with such information representing a movement of the belt to the left, the information in the counter 330 will be greater than the information in the Address register 335 so that the Q6 signal will be provided to allow for output signals to pass through the gate 320. At the same time, the gate 338 will no longer produce an output signal, so that no signals pass through the gates 336 and 337. Also, the signal Q6 controls the diode 284 to allow for a negative voltage to be passed to the motor amplifier 290 to control the motor 280 to drive the belt in a left direction. The output signals from the differential amplifier 312 are passed first through the inverter 314 so as to invert the pulse signal and with all the inverted positive pulses being eliminated by the rectifier 324 so that only the inverted negative pulses are passed to the Schmitt trigger 318. A down count from the gate 320 is therefore produced in accordance with the inverted negative pulses. The counter 330 is counted down until the number held in the counter 330 represent the number in the Address register 334, at which time the output from the gate 320 is stopped, the negative voltage passed through the diode 282 is stopped, and the gates 336 and 337 are turned on. The output from the differential amplifier 312 is then passed to the motor controller to provide for the fine control of the position of the belt in the same manner as indicated above.

It can therefore be seen, with reference to FIG. 6, that a relatively simple control is provided to automatically position the XY positioning system using information supplied from a keyboard and with both a coarse and fine movement of the XY positioning system to provide a rapid and accurate movement of the positioning system. The initial coarse control is essentially digital in form since it is controlled by the pulses in the pulse signal from the Schmitt trigger. The fine control is analog in form since it is controlled by the sloping portion between a plus and minus pulse in the pulse signal from the differential photodetector.

FIG. 7 illustrates a Select cycle flow chart which illustrates the selection of an individual one of the frames on the microfiche card either through the use of the manual joy stick control or the automatic keyboard control. In FIG. 7, the keyboard 16 may be used to select the desired one of the individual frames on the microfiche card and may also be used to select an individual one of the microfiche cards from a group of such cards if an automatic selector system is used. If such an automatic selector system is used, as shown by the Select step 350, as activated by a Select key 15, then an individual one of the microfiche cards is selected and is presented to an initial feed position. If, on the other hand, a microfiche card is inserted manually, either through the opening 14 or the slot 13, the Select step 350 is still activated by the Select key 15 and the manual insertion of the card is sensed as shown by Sense Select step 352. This sensing of the card in the feed position is provided by the use of the Sense Select detector 134 shown in FIG. 2. This detector is a photodetector that detects the presence of a card at the feed position. A similar photodetector may be used to detect the presence of a card at the slot 13.

If a microfiche card is sensed, then the jaws of the jaw assembly 66 are closed to grip the card as shown by step 354. The jaws are closed by the deactivation of the solenoid 124 and such closing of the jaws is sensed by the microswitch detector 132, as indicated by step 356. At this time, the card is to be pulled straight back along the Y axis, as shown by step 358, and such movement is guided by the slot 89 or the slot 91 and is controlled by the Q5 signal for the Y axis controller in the manner described with reference to FIGS. 5 and 6. The Q5 signal provides for power applied to the motor control circuit to pull the card straight back. When the card is pulled straight back, it is necessary to determine that the card is now clear of the Feed position and this is detected by the Clear step 360. Such detection may be accomplished through the use of the sensor 139 to determine when the card has been pulled sufficiently back along the Y axis.

Once the card has been pulled back along the Y axis to a clear position, then it is possible to move the card to a predetermined location along both the X and Y axes. This predetermined location may be controlled by information supplied through the keyboard 16 in the Automatic cycle, or may be controlled mechanically using microswitch detectors 140 and 142. The movement of the card along both the X and Y axes may be accomplished simultaneously. The Y axis control is already on, as initiated by the step 358, and this is continued after the microfiche card has been determined to be clear of the feed position by the step 360 and when the Y axis position of the card is at the predetermined position as determined by the step 362, the Y axis drive is stopped as shown by step 364 by discontinuing the Q5 signal. The predetermined position for the automatic system occurs when the number in the Address register is equal to the number in the counter. The predetermined position for the manually controlled system occurs when the microfiche card reaches a position as detected by microswitch 142.

The X axis movement is controlled as shown by step 366 which again represents a Q5 signal for the X axis controller. When the card is at the proper X Address, as shown by step 368, and as determined either by the keyboard number equal to the counter number or by the microswitch 140, then the X drive is stopped as shown by step 370.

If the control has been automatic, as provided by information from the keyboard 16 and as shown in FIG. 6, then the card is now at the proper address for readout. If, on the other hand, the control is manual, the card has been moved to a preset position but the joy stick must now be used to further control the card to provide for the movement of the card to the desired position for readout of a particular individual frame in the microfiche card. The Select cycle of FIG. 7, therefore, provides for movement of the card to a predetermined position, either controlled by the keyboard or controlled by a determination of the position of the card by sensor readouts.

FIG. 8 illustrates the Replace cycle for the card after the readout has been accomplished, which Replace cycle is the same for both the manual and automatic Select systems. In FIG. 8, the initial step in the Replace cycle is the activation of the Replace key 17 as shown by step 400, which key is part of the keyboard 16. The activation of the Replace key provides for a drive of the motor controller for the X axis to the left, as shown by step 402. This would be accomplished as indicated in FIGS. 5 and 6 by the activation of the Q6 signal for the X axis controller.

When the X drive is at a fully left position, as determined by a microswitch 138, and as shown by step 404, then the X drive is stopped, as shown by step 406. At the same time, Y drive is initiated as shown by step 408 which again would be controlled by a Q6 signal for the Y axis controller. This drives the card forward to the Replace position which is detected by a microswitch 136 and is shown by step 410. At this time the jaws are open, as shown by step 412, so as to release the card and at the same time the Y drive is moved back as shown by step 414, to the select position.

The jaws are maintained in the open position as shown by step 416 so as to be ready for the receiving of a new card and the open position of the jaws is detected by the switch 132. The Y drive is then stopped as shown by step 418 with the jaws slightly pulled away and ready to receive a new card. If, for example, a card is inserted manually into the machine, it would be pushed into the position between the jaws in the open position. If the card is selected from one of a number of cards using an automatic select mechanism, then the card that is selected would be moved forward away from the group of such cards and also inserted between the jaws. Upon activation of the Select cycle, as shown in FIG. 7, an individual card will be gripped by the jaws for positioning. The Replace cycle may also be used to move a selected card to the slot 13 by the use of a duplicate solenoid assembly and sensors 132, 136 and 138 and by driving the X drive to the right and using the slot 91 to guide the positioning in the Y direction.

FIG. 9 illustrates a block diagram of an alternative system for providing automatic control of the selection of an individual one of the frames on a microfiche using a keyboard entry. For example, the keyboard may be the keyboard 16 shown in FIG. 1. The system of FIG. 9 is shown for the Y axis but it is to be appreciated that a similar system would be used for the X axis.

The output from the keyboard 16 is to a Y register counter 450 which represents the Y desired position. The output from the Y register 450 is coupled to a magnitude comparator 452. The magnitude comparator 452 also receives an input from a second Y register counter 454 which has output representative of the Y actual position. The inputs to the register counter 454 are upcount and downcount signals which are produced from a clock generator 456. The clock generator also produces A and B signals which will be described at a later portion of this specification. The input to the clock generator is from a photodetector 300 which produces pulse signals representative of the direction of movement of the table 54 in the forward or back direction for the Y axis. It is to be appreciated that the photodetector senses openings in a belt member 302 as shown in FIG. 6(*a*). The output from the photodetector are pulse signals having positive and negative portions and with these pulse signals displaced in time relative to each other. As shown in FIG. 2, the output from the photodetector is to amplifiers 458 and 460, which amplifiers eliminate the negative portion of the pulse signal so that the output signals from the amplifiers 458 and 460 are positive pulses and with the positive pulses from the amplifier 458 displaced in time relative to the positive pulses from the amplifier 460. The outputs from the amplifiers 458 and 460 are applied to Schmitt triggers 462 and 464. The outputs from the Schmitt triggers 462 and 464 are designated as $\overline{B}$ and $\overline{A}$. The $\overline{B}$ signal as modified by delay lines 466 and 467 and an inverter 468 is applied to a pair of AND gates 470 and 472 to produce signals representing the B transition in an up direction and the B transition in the down direction. The $\overline{A}$ signal is passed through an inverter 474 and a delay line 476 and applied to an AND gate 478 to produce an outpug signal from the AND gate 478 representative of an A transition signal in the direction. The A and B signals are shown in FIG. 11 and with the A signal 480 representing the signal produced for a down direction in the Y axis and the signal 482 representing the A signal produced with an up direction for the Y axis. In a similar fashion, signal 484 represents the B signal when the movement is in a down direction along the Y axis and signal 486 represents a B signal from the up movement along the Y axis. It is to be appreciated that similar signals would be produced from similar systems for the X axis representing right and left movement along the X axis.

Returning to FIG. 10, the outputs from the AND gate 472 and the $\overline{A}$ signal are applied to an AND gate 488. The output from the AND gate 488 is applied to an AND gate 490. The output from the AND gate 490 is interconnected with a second AND gate 492 which also has its output interconnected as an input to AND gate 490. The AND gate 492 also receives a signal representing $\overline{Y}$ up. The outputs of the AND gates 490 and 492 represent the control toggle and control toggle bar signals, which signals are shown in FIG. 11 as signals 494 and 496. These signals are applied to a pair of AND gates 498 and 500, which AND gates also receive input signals representing B transition up (B ) and $\overline{A}$ for gate 500 and signals representing A transition up (A ) and $\overline{B}$ for AND gate 498. The output from the AND gates 498 and 500 are passed through inverters 502 and 504 to produce signals representing the Y up count and the Y down count signals. These up and down count signals are produced in accordance with the logic formula shown in FIG. 11, which logic equation represents the input to the gates 498 and 500. It is to be appreciated that the control toggle signals 494 represent the output signals for a movement in the Y direction up, and the control toggle signal 496 represents the output signal for a movement in the Y direction down.

Returning now to FIG. 9, it can be seen that the initial operation of the system would be to provide keyboard entry from the keyboard 16. After the keyboard entry of the desired position is accomplished, then the Select button on the keyboard would be pushed to set a Y Compare flip-flop 506. This produces a compare signal which is used as an input to gates 508, 510, 512 and 514. The magnitude comparator 452 produces one of three signals in accordance with the difference between the desired position and the actual position along the Y axis. In accordance with a difference between the desired and actual position, either the gate 508 or the gate 510 will produce an output signal to control flip-flops 516 or 518. If flip-flop 516 is set, then a Q5 signal would be produced which may be used in the motor control circuit of FIG. 5 or FIG. 6(c). In the same way, the energization of the flip-flop 518 controls the production of the Q6 signal which may be used to control the motor to drive the table in the Y direction. This initial drive would be quite rapid since the Q5 and Q6 signals would be at maximum amplitude to control the motor.

Assuming that the flip-flop 516 is initially energized, this drives the motor to produce a movement back hard in the Y direction. This occurs until the D=A signal is received to reset the flip-flop 516. However, there will normally be an overshoot and in order to provide for an accurate positioning of the microfiche card, it is desirable to correct for this overshoot and the system of FIG. 9 provides for such correction using a fully digital system. After the system is driven back hard in the Y direction, the AND gate 512 provides a signal to control a flip-flop 520 to produce a movement in the forward direction, which is referred to as semi-hard since this drive is through a resistor 522 and is not as rapid as the initial driving the motor. This, however, will still produce some overshoot and the direction of movement is reversed again through the use of the AND gate 514 producing a signal passing through an OR gate 521 to control a flip-flop 524. The output from the flip-flop 524 provides a Y back soft drive through the use of a resistor 526 which limits the drive signal through the use of a resistor 526 which limits the drive signal to provide a relatively slow movement. This resistor, therefore, has a value greater than the value of the resistor 522 used for the Y forward semi-hard drive. Any overshoot from the Y back soft drive is relatively constant and therefore the mechanical structure may be offset so as to compensate for this slight error. This is the main reason why it is necessary to provide for the last movement to always be in the same direction and when the initial movement is back it is desirable to provide for the intermediary forward semi-hard drive so that the last movement will always be the Y back soft drive.

If the initial drive is controlled from the Y forward hard signal produced by the flip-flop 518, then the intermediary movement is by-passed through the use of the AND gate 528 which resets the flip-flop 520 and controls through the OR gate 521 the setting of the flip-flop 524. The drive sequence is then initially either back or forward with a rapid drive and with an intermediary forward semi-rapid drive when the initial drive was back and with a final slow drive back to produce an accurate positioning of the microfiche card.

FIG. 12 illustrates a flow chart of the operation of this digital control system. The modification of the flow chart of FIG. 7 is shown for the Y axis, but it is to be appreciated that a similar flow chart modification would be used for the X axis also. The step 362 which determines whether Y is at the address would be provided by the magnitude comparator 452 which provides one of three outputs and would also be used to control the output from the step 530 which controls the forward or backward direction of the Y drive. For the backward direction, the Y drive is driven until D=A, at which time the Y back drive is turned off, as shown by step 532. The drive system is then controlled to provide for a movement in the forward direction as shown by drive 534. This forward direction drive is continued until the conditions are met as shown by step 536, at which time the drive is again reversed, as shown by step 538. If the initial drive had been in the forward direction, this occurs until D=A, at which time the forward direction drive is turned off, as shown by step 540, and with a reversal in direction as shown by step 538. When the conditions are met as shown by step 542, then the entire Y drive is stopped, as shown by step 364.

FIG. 13 illustrates a modification of the table 54 and specifically the aperture area 56 to provide for an accurate reproduction of the information on the microfiche card 50. Specifically, as shown in FIG. 13, the microfiche card is positioned between a pair of transparent plate members 550 and 552. The plate member 552 is retained in a ring 554 which includes a plenum chamber 556 to receive a flow of air and a series of channels 558 to direct the air to the card 50 to maintain the card against the upper plate member 550. The openings 558, therefore, extend around the circumference of the plate member 552. The ring member 554 is supported in a tubular member 560 and the tubular member 560 includes a right-angled opening 562 to receive a supply of air and direct the air to the plenum chamber 556, which in turn supplies air to a plurality of openings 558. It can be seen, therefore, that the card 50 is maintained in engagement with the upper transparent member 550 by the air directed at the card from the plurality of openings 558 so as to provide for an air platen to support the card in the area of reproduction in a flat plane and provide for an accurate optical reproduction of the information contained on the card.

The present invention, therefore, provides for a selection of an individual one of the frames on a microfiche card using a simple and reliable mechanism including an XY positioning system having four rods and three blocks and with one block acting as a follower and sliding on two of the rods and with the other blocks controlled by belt drives and with the mechanical limits of the follower block controlled by a pin member extending in an opening and with slots for guiding the pin member to Select and Replace positions and with the movement of the card held by a jaw assembly attached to the follower block and with the control of such movement either accomplished using a joy stick control with a road map visually indicating the position of the readout relative to the microfiche card or with the control of such movement accomplished automatically using a keyboard to insert information relating to a selected position and with the XY positioning system controlled to move the card automatically to that selected position. The control system is essentially identical for both the X and Y axes to simplify the construction.

Although the invention has been described with reference to particular embodiments, it is to be appreciated that adaptations and modifications may be made and the invention is only to be limited by the appended claims.

We claim:

1. Microfiche card readout apparatus for providing a readout of an individual one of a plurality of frames arranged on the card in rows and columns, the apparatus comprising:

a support for holding the card in a plane for readout, the support having an opening at a readout position for passage of light through the card, clamp means for holding the card for movement over the support, positioning means connected to aid clamp means for moving the card along orthogonal X and Y axes, control means coupled to said positioning means for positioning the card with a selected individual frame at the readout position, said positioning means including a pair of fixed orthogonal guide rods each having a block member slidably mounted thereon, each block member having a positioning rod extending therefrom perpendicular to the respective guide rod;

a follower block slidably mounted on both of said positioning rods for motion along X and Y axes, the positioning rods being orthogonally slidable through and supporting said follower block;

and said clamp means comprising a card engaging jaw pivotally secured to said follower block.

2. The microfiche readout apparatus of claim 1, wherein said positioning means further includes a flexible belt connected to each of said slide blocks, each belt having drive means coupled thereto, and said control means being connected to said drive means.

3. Microfiche card readout apparatus for providing a readout of an individual one of a plurality of frames arranged on the card in rows and columns, the apparatus comprising:

a support for holding the card in a plane for readout, the support having an opening at a readout position for passage of light through the card, clamp means for holding the card for movement over the support, positioning means connected to said clamp means for moving the card along orthogonal X and Y axes, control means coupled to said positioning means for positioning the card with a selected individual frame at the readout position, said positioning means including a pair of orthogonal guide rods each having a block member slidably mounted thereon, each block member having a positioning rod extending therefrom perpendicular to the respective guide rod;

a follower block slidably mounted on both of said positioning rods for motion along X and Y axes, the positioning rods being orthogonally slidable through and supporting said follower block;

said clamp means comprising a card edge engaging jaw pivotally secured to said follower block;

a flexible belt connected to each of said slide blocks, each belt having drive means coupled thereto;

said control means being connected to said drive means;

said belts having coded position indicating means thereon;

and said control means including position sensors responsive to said indicating means.

4. The microfiche readout apparatus of claim 3, wherein said control means includes position selecting means for producing coded signals corresponding to a selected frame position on the card, comparator means for comparing the selected position signals with the actual position signals represented by the indicating means on said belts, and providing drive signals to said drive means to move the card until the selected and actual position signals correspond.

5. The microfiche readout apparatus of claim 4, wherein said comparator means provides signals for actuating the drive means rapidly until the card position is near the selected position and, by comparison of the respective signals, switches to slow drive signals for final positioning.

* * * * *